Dec. 31, 1940.  E. ZAHM ET AL  2,226,958
APPARATUS FOR CARBONATING LIQUIDS
Filed June 23, 1938  2 Sheets-Sheet 1

Edward Zahm
George G. Zahm
INVENTORS

BY *(signature)*
ATTORNEYS

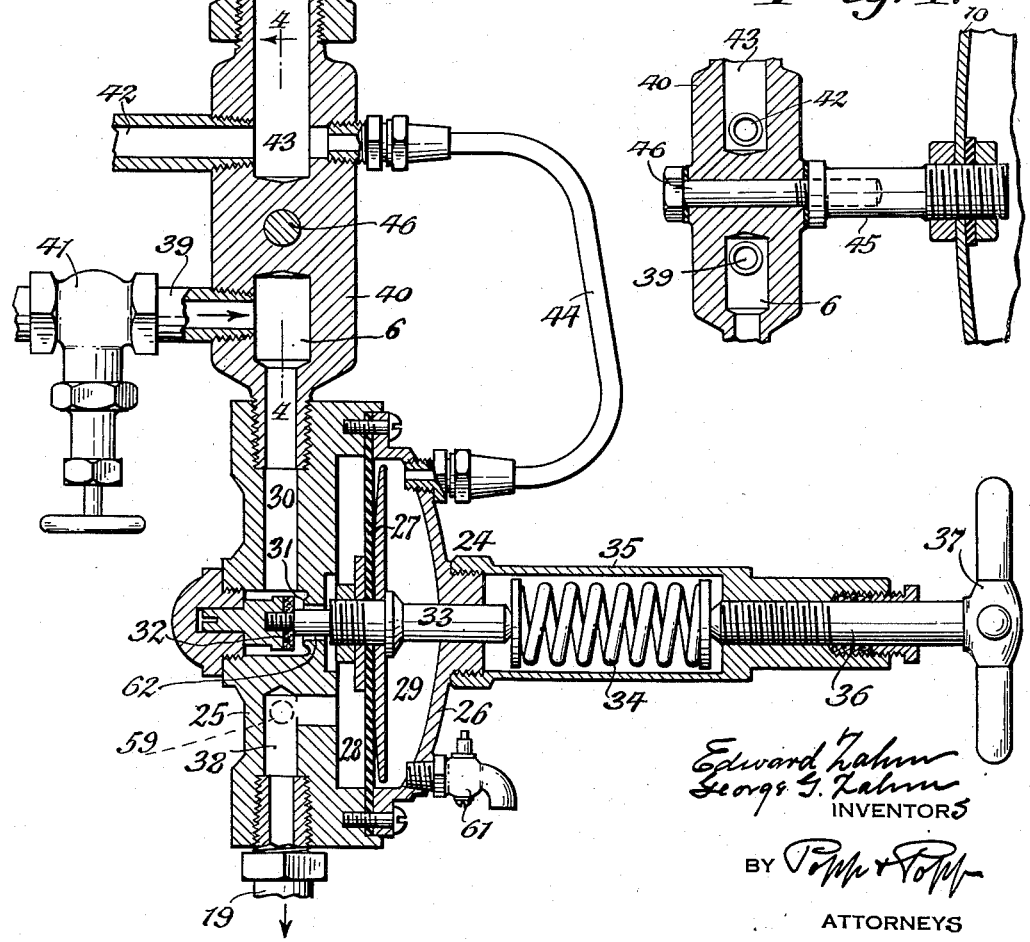

Patented Dec. 31, 1940

2,226,958

UNITED STATES PATENT OFFICE 2,226,958

APPARATUS FOR CARBONATING LIQUIDS

Edward Zahm and George G. Zahm, Buffalo, N. Y., assignors to Zahm & Nagel Co. Inc., Buffalo, N. Y., a corporation of New York Application June 23, 1938, Serial No. 215,506

1 Claim. (Cl. 261—122)

This invention relates to an apparatus for carbonating beer or other liquids and more particularly to apparatus by which carbon dioxide gas is passed through a dispersing element while the latter is submerged in the liquid to be carbonated.

When carbonating beer or beverages by passing dispersed carbon dioxide gas through the same it is essential, in addition to maintaining the required counter-pressure for causing absorption of the $CO_2$ gas by the liquid, to bring the gas into the most intimate contact with the liquid and also produce the largest surface contact between the same, inasmuch as the absorption of gas by the liquid is quickened in the same measure as the area of contact between the gas and liquid is increased.

It is therefore advantageous when passing the gas through the liquid to make the bubbles as small as possible because the smaller the bubbles are the greater will be the relative surface thereof which is exposed to the liquid and consequently the greater the absorption of gas by the liquid.

When passing a gas through a liquid for the purpose of causing absorption of the gas by the liquid the rapidity of such absorption is dependent on the length of time required for the gas bubbles to rise from the bottom of the liquid, where they are admitted to the liquid, to the top of the liquid where they escape from the liquid and from this it follows that the longer the gas is in contact with the liquid, the greater the amount of gas which will be absorbed by the liquid.

It is also recognized that the smaller the gas bubbles are when they enter the liquid the slower they will rise to the top of the same inasmuch as the buoyancy of the bubbles and consequently the rate of upward movement through the liquid increases as the bubbles become larger and at a greater ratio than the resistance which is encountered by the flow of the bubbles through the liquid.

It follows from this that when carbonating a liquid by dispersing the gas when admitted to the liquid the finer the dispersion of the gas when admitted to the liquid, the greater the amount of gas which will be absorbed and the less gas will escape from the upper surface of the liquid and consequently less gas will be lost.

Heretofore carbonating of liquid has been carried on by the use of various elements for dispersing the gas, but no attempt has been made to control the size of the gas bubbles nor the rate of flow of the gas through the liquid and the operation of carbonating the liquid was therefore not uniform.

The object of this invention is to provide an apparatus in which a constant differential is maintained between the inlet and outlet sides of the dispersing element, thereby securing a uniform flow of gas through the same and to the liquid being carbonated regardless of any variation in pressure on the discharge side of the dispersing element.

In the accompanying drawings:

Fig. 3 is a vertical section, on an enlarged scale, showing suitable forms of balancing and relief valves and associated parts employed in this apparatus.

Fig. 4 is a fragmentary vertical section, on a reduced scale, taken on line 4—4, Fig. 3 and showing the preferred means for supporting the balancing and relief valves on the tank containing the liquid to be carbonated.

In the following description similar characters of reference indicate like parts in the several figures of the drawings.

The numeral 10 represents the tank which is adapted to contain the liquid to be carbonated and which may be of any desired form and have the liquid supplied thereto and withdrawn therefrom in any suitable manner.

Figure 1:
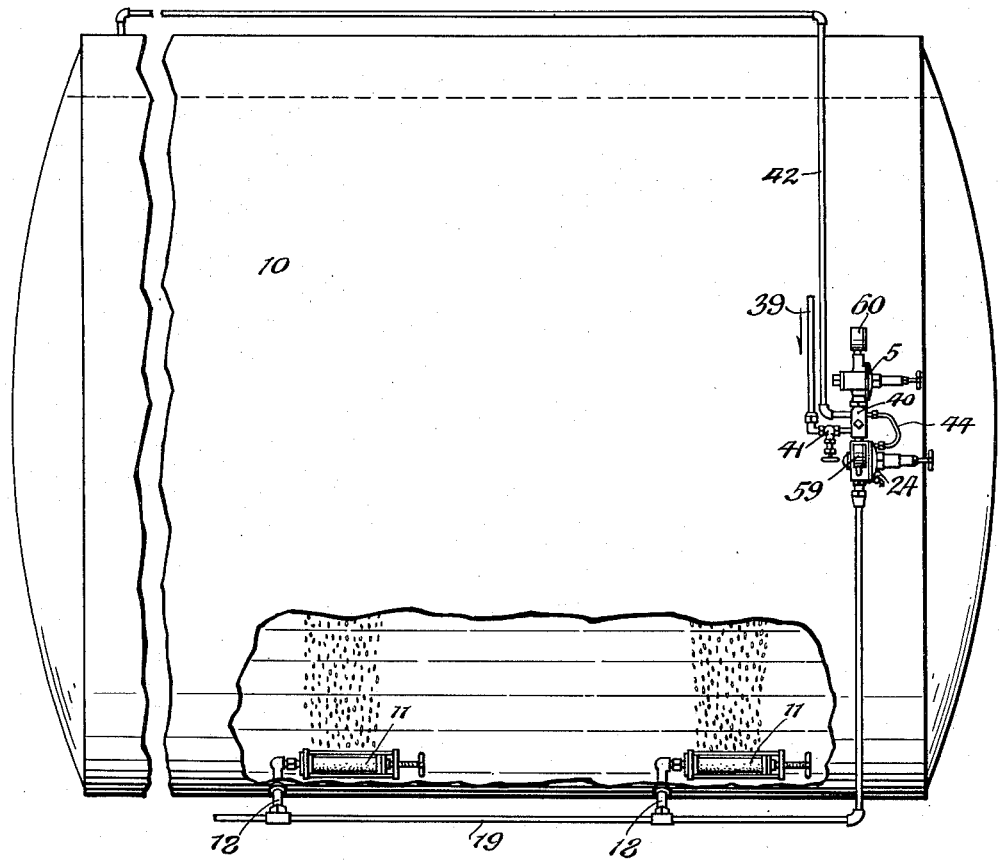
Fig. 1 is a side elevation, partly broken away, of a tank equipped with an approved form of apparatus embodying this invention.
Figure 2:
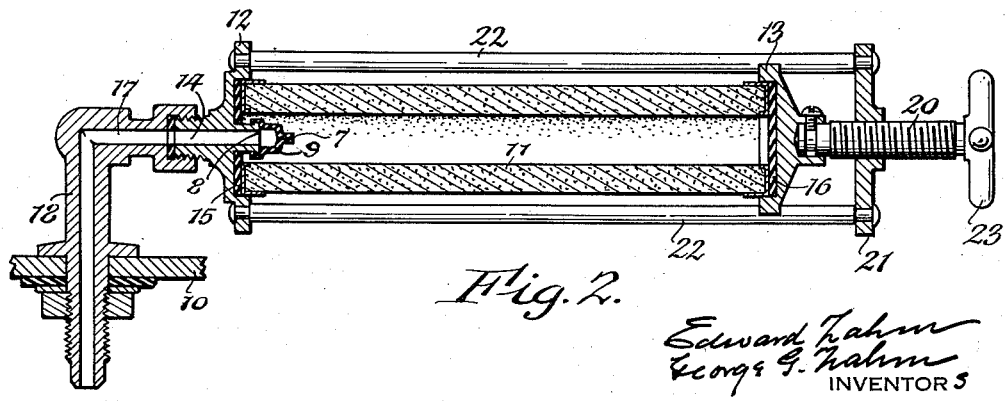
Fig. 2 is a longitudinal section of one of the gas dispersing elements forming part of this invention.

Within the lower part of the liquid holding tank are arranged the means for dispersing the carbonic acid gas which means may be variously constructed but preferably comprise one or more tubular stones or tubes 11 of inert porous material, for example two of such tubes arranged lengthwise in different parts of the tank at the bottom thereof. Each of these dispersing tubes is mounted on the tank so that the same can be readily assembled with other parts for use and also disassembled for inspection, cleaning and replacement when required. The preferred means for thus mounting each dispersing tube in the tank shown in Figs. 1 and 2 are constructed as follows:

The numerals 12, 13 represent a fixed front head and a movable rear head, respectively, which are held in engagement with the front and rear ends of the dispersing tube, said front head 12 being provided with an axial inlet passage 14 through which the gas enters the interior of this tube while the rear head 13 is imperforate and closes the respective end of this tube. Leakage through the joints between the ends of this tube and its front and rear head is prevented by gaskets 15, 16 interposed between the opposing surfaces of the members, as shown in Fig. 2. The front head 12 is connected with the horizontal part 17 of a branch gas supply pipe which latter has a transverse part 18 extending through the adjacent part of the tank and connects the outside of the latter with a distributing pipe 19 from which gas is conducted through the branch pipe 17, 18 and the passage 14 into the respective dispersing tube. The rear head 13 is pressed against the rear end of the dispersing tube by a screw 20 which works in a thread opening in a cross-piece 21 which is connected with the front head by a plurality of longitudinal frame bars 22, said screw having its inner end connected with the central part of the rear head and provided at its outer end with a handle 23 whereby the screw may be turned manually for either clamping the rear head 13 against the tube or releasing the same when it becomes desirable to inspect or clean the tube or necessary to replace the same in case of breakage or imperfection.

A check valve is provided which permits the carbonating gas to enter the dispersing tube through the inlet 14 thereof but prevents the liquid from backing into the gas inlet line. This is preferably accomplished by an elastic valve cap 9 applied to a nipple 8 arranged on the inner side of the fixed head 12 and provided with a slit 7 which is opened by the forward pressure of the gas as the same enters the tube but automatically closed in the event of any backward pressure in this tube.

Means are provided for maintaining a predetermined differential between the pressure of the carbonating gas on the inner side of the gas dispersing tubes and counter-pressure on the outer side of the same which means in their preferred form are constructed as follows:

Referring to Figs. 1 and 3 the numeral 24 represents generally a balancing valve having a body 25 and cover 26 between which a movable or flexible diaphragm 27 is arranged, thereby forming a regulating or working chamber 28 and a balancing chamber 29. The body of the balancing valve is provided with a gas inlet 30 which communicates by a port 62 with the central part of the regulating chamber and this port is provided with a valve seat 31 which faces toward the gas inlet 30. The numeral 32 represents a valve closure which is guided on the valve body and is movable toward and from the valve seat 31 and is connected with the inner end of a valve stem 33 having its central part secured to the diaphragm 27. The outer end of the valve stem is guided on the valve cover 26 and engages with the inner end of a pressure regulating spring 34 arranged within a tubular neck 35 mounted on the outer side of the valve cover. The tension of this spring may be varied by an adjusting screw 36 working in the outer end of the neck 35 and bearing at its inner end against the outer end of the tension spring and provided at its outer end with a handle 37 for manipulating the same.

Communication is established between the regulating chamber 28 and the inner side of the several dispersing elements by connecting the gas distributing pipe 19 with a passage 38 formed in the body of the balancing valve and leading into the regulating chamber.

The gas for carbonating the beer in the tank is supplied under pressure from any desired source through a supply pipe 39 and first discharged into a passage 6 in the lower part of an upright header or manifold 40 and then conducted from the lower end of the latter to the inlet 30 of the regulating chamber 28, said supply pipe being provided with a hand valve 41 for opening or closing the gas supply.

Communication is established between the space in the top of the carbonating tank and the balancing chamber 29 for the purpose of balancing the counter-pressure in accordance with a predetermined differential between the pressures on the inner and outer sides of the dispersing elements, this communication being preferably secured by a relief pipe having a main section 42 extending from the top of the carbonating tank to a passage 43 in the upper part of the header 40 and a branch pipe 44 connecting this passage 43 with the balancing chamber.

The header may be supported in any suitable manner for instance by a bracket 45 secured to the side of the tank, and a screw or bolt 46 connecting the header with said bracket, as best shown in Fig. 4.

Means are provided for maintaining the desired counter-pressure in the tank and permitting any excess pressure to escape to the atmosphere. This is accomplished by a relief valve 5 having a body 47, and a cover 48 between which a movable or flexible diaphragm 49 is arranged, thereby forming a relief chamber 50 in the body 47 of which the diaphragm 49 constitutes a movable wall. This relief chamber is provided with a relief port 51 which leads to the outer atmosphere and has a valve seat 52 facing inwardly or toward the relief chamber, as shown in Fig. 3. The numeral 53 represents a relief valve closure which is movable toward and from the valve seat 52 and mounted on the rear end of a valve stem 54 which has its central part secured to the central part of the diaphragm 49. The front end of the valve stem 54 is guided in the cover 48 and engages with the inner end of a tension spring 55 which is arranged within a tubular neck 56 secured to the front side of the relief valve cover 48.

The resistance of this spring may be regulated by means of an adjusting screw 57 threaded into the outer end of the neck 56 and bearing at its inner end against the outer end of the spring 55 and provided at its outer end with a handle 58 for manipulating the same.

A pressure gauge 59 is connected with the passage 38 forming part of the line leading from the regulating chamber 28 to the inner side of the dispersing tubes to permit of determining the pressure under which the carbonating gas is being supplied to the dispersing elements, and a similar gauge 60 is connected with the relief chamber 50 for the purpose of determining the pressure of the gas on top of the liquid in the tank.

If any liquid should accumulate in the balancing chamber 29 or should it become desirable to wash out the lines communicating with this chamber, this can be done by opening a pet cock 61 connected with the lower part of the balancing chamber.

Preparatory to operating this apparatus each of the tubular dispersing tubes 11 is subjected to a capillary test up to, say, about four pounds pressure below which pressure no gas passes through these tubes and a pressure differential is determined at higher pressures in accordance with the desired speed at which the beer or liquid in the tank 10 is to be carbonated. The flow of gas through the tubular dispersing stones 11 varies considerably depending on the pressure differential between the inner and outer sides of these stones, the following table illustrating substantially the effect when operating under the indicated pounds of difference in pressure and the number of cubic feet of gas per hour it is desired to pass through the liquid in the tank for carbonating the same when using tubular stones having a capillary test of approximately four pounds:

| Pressure differential in pounds | Cubic feet of gas to be passed per hour |
| --- | --- |
| 6 | 60 |
| 7 | 80 |
| 8 | 110 |
| 9 | 180 |

This table shows that if the supply of gas to the beer or liquid is to be uniform throughout the process, the pressure differential between the inside and the outside of the tubular dispersing stones must be quite closely regulated.

In advance of starting the apparatus and process, after determining the pressure differential desired for delivering the predetermined quantity of gas per hour to the liquid to be carbonated the hydrostatic head of the liquid in the tank must be first estimated and considered in connection with the pressure at which the gas is supplied to the dispersing stones, consequently the initial setting of the gas pressure is the desired flow differential plus the hydrostatic head pressure.

Since beer is usually carbonated with a counter-pressure of up to ten pounds or more this pressure is permitted to accumulate in the top of the tank until the desired pressure is attained at which time the excess pressure is blown off through the relief valve 5 which has been set to operate at that pressure.

When carbonating with finely dispersed gas this counter-pressure may not build up to the desired extent in several hours, but to manually build up this pressure differential while this counter-pressure is building up would be impractical particularly if it were attempted to maintain a reasonably constant flow of gas. Assuming that carbonating was taking place at eight pounds differential and introducing 114 cubic feet of gas per tubular stone during each hour the building up of two pounds counter-pressure would cut the flow of gas down to sixty cubic feet per hour, and a further reduction of two pounds counter-pressure would practically stop the flow of gas altogether. In order to maintain a constant uniform flow of gas into the beer the pressure on the inside of the tubular stones must be built up in synchronism with the rising pressure on the outside of the stone due to the rising counter-pressure. This purpose is accomplished by the present improved method and apparatus.

When this apparatus is in operation the CO₂ gas which is supplied by the pipe 39 under relatively high pressure say 36 pounds, from any desired source passes through the inlet 30 and port 62 into the regulating chamber 28 of the balancing valve 24, thence from the outlet 38 of the latter, through the distributing pipe 19, branch pipes 17, 18 into the tubular dispersing tubes 11, thence through the pores of the latter which divide the gas and deliver the same in the form of fine bubbles into the lower part of the beer in the tank, and then these gas bubbles due to their buoyancy pass upwardly through the beer and are absorbed by the same and a small unabsorbed quantity accumulating in the top of the tank above the level of the beer therein.

When starting the apparatus to run, say, at an 8 pound pressure differential with a 5 pound hydrostatic head, the gauge 59 is set at a pressure of 13 pounds by means of the hand adjusting screw 36 which acts on the spring 34. The gauge 60 at this time would show no pressure, but as the counter-pressure builds up in the top of the tank the pipes 42, 44 will transmit this pressure to the outer side of the diaphragm 27 of the balancing valve and consequently add this pressure to the tension of this spring, thereby causing the working pressure on the inner side of the diaphragm to rise to the same degree and to be indicated on the gauge 59. By these means the regulating valve will be opened to a greater extent when the counter-pressure in the tank outside of the dispersing elements rises, thereby automatically maintaining the same pressure differential between the inlet or working pressure side and the outlet or counter-pressure side of the dispersing elements and causing the gas to flow uniformly through the liquid in the tank while the apparatus is in normal operation.

We claim as our invention:

An apparatus for carbonating liquids comprising a tank adapted to contain the liquid to be carbonated, a porous gas disperser which is arranged directly in the lower part of the tank and adapted to be submerged in the main body of the liquid therein and through which carbonic acid gas is forced into said liquid; and balancing means for maintaining a constant pressure differential between the gas inlet and gas outlet of said disperser to secure a uniform flow of gas regardless of variation in counterpressure on the outlet side of said disperser, said balancing means including a working chamber communicating with the inlet of said disperser and having an inlet to which carbonic acid gas is supplied under pressure, a balancing chamber communicating with the upper part of the tank, a movable diaphragm forming a wall between said working chamber and said balancing chamber and movable back and forth in response to variations in the pressure of the gas in said chambers against opposite sides of said diaphragm, and a valve member which controls the gas inlet of the working chamber and which is moved to close the same by the pressure of the gas in said working chamber against one side of the diaphragm and to open the same by the pressure of the gas in said balancing chamber against the opposite side of said diaphragm.

EDWARD ZAHM.
GEORGE G. ZAHM.